US012090531B2

(12) United States Patent
Martinez et al.

(10) Patent No.: US 12,090,531 B2
(45) Date of Patent: Sep. 17, 2024

(54) SURFACE CLEANING TOOLS

(71) Applicant: MICRONOVA MANUFACTURING, INC., Torrance, CA (US)

(72) Inventors: Lorena Martinez, Downey, CA (US); Phillip LeCompte, Anaheim, CA (US); Mary Taylor, Redondo Beach, CA (US)

(73) Assignee: MICRONOVA MANUFACTURING, INC., Torrance, CA (US)

( * ) Notice: Subject to any disclaimer, the term of this patent is extended or adjusted under 35 U.S.C. 154(b) by 0 days.

(21) Appl. No.: 17/433,228

(22) PCT Filed: Feb. 24, 2020

(86) PCT No.: PCT/US2020/019536

§ 371 (c)(1),
(2) Date: Aug. 23, 2021

(87) PCT Pub. No.: WO2020/176423

PCT Pub. Date: Sep. 3, 2020

(65) Prior Publication Data

US 2022/0126334 A1 Apr. 28, 2022

Related U.S. Application Data

(60) Provisional application No. 62/810,026, filed on Feb. 25, 2019.

(51) Int. Cl.

| | |
|---|---|
| ***B08B 9/00*** | (2006.01) |
| ***B08B 9/043*** | (2006.01) |
| ***B08B 9/08*** | (2006.01) |

(52) U.S. Cl.
CPC .......... *B08B 9/0436* (2013.01); *B08B 9/0808* (2013.01)

(58) Field of Classification Search
CPC ....... B08B 9/0436; B08B 9/0808; B08B 9/04; B08B 9/087; B08B 2209/04; B08B 1/005; B08B 9/027; A47L 13/254; A47L 13/08; A47L 13/11; A47L 13/00; F16L 2101/12; F16L 55/30; F16L 55/162; F16L 2101/60
See application file for complete search history.

(56) References Cited

U.S. PATENT DOCUMENTS

| | | | |
|---|---|---|---|
| 2,265,551 A | 12/1941 | Steccone | |
| 2,432,924 A | 6/1946 | Nishizaka et al. | |
| 5,918,342 A | 7/1999 | Smith et al. | |
| 2003/0235457 A1 * | 12/2003 | Smith ..................... | A47L 13/22 15/247 |

(Continued)

OTHER PUBLICATIONS

Van, SuMei, International Search Report, Apr. 17, 2020, 5 pages, Australian Patent Office, Woden ACT 2606, Australia.

(Continued)

*Primary Examiner* — Mikhail Kornakov
*Assistant Examiner* — Emily H Yasharpour
(74) *Attorney, Agent, or Firm* — James A. Henricks; Scott R. Hansen

(57) ABSTRACT

A surface cleaning tool has a frame supporting a resiliently flexible panel supported by the frame in an arcuate configuration such that at least one of first and second opposite end portions of the resiliently flexible panel can be moved closer to the other end portion.

19 Claims, 3 Drawing Sheets

(56) References Cited

U.S. PATENT DOCUMENTS

| | | | | |
|---|---|---|---|---|
| 2011/0107537 | A1* | 5/2011 | Benson | A47L 13/24<br>15/228 |
| 2014/0110544 | A1* | 4/2014 | Chang | F16M 11/043<br>248/207 |

OTHER PUBLICATIONS

Van, SuMei, Written Opinion of the International Searching Authority, Apr. 17, 2020, 5 pages, Australian Patent Office, Woden ACT 2606, Australia.

* cited by examiner

SURFACE CLEANING TOOLS

CROSS REFERENCE TO RELATED APPLICATIONS

This application is a National Stage of International Application No. PCT/US20/19536, filed Feb. 24, 2020, which claims priority from 62/810,026 filed Feb. 25, 2019, the entire contents of which are incorporated herein by reference.

BACKGROUND

Field

These inventions relate to tools for cleaning interior cylindrical surfaces, including for example pipes, tubes and channels.

SUMMARY

In one example of a cleaning tool, for example for interior cylindrical surfaces, the cleaning tool includes a support structure or frame, a handle attachment or adapter, and a resiliently flexible panel supported at the opposite end portions of the support structure or frame. In one configuration, the panel is supported so as to have an arcuate configuration, and in a further example, at least one end portion of the panel is mounted on the support structure in such a way as to allow the at least one end portion to be movable relative to the support structure. In one example, the at least one end portion is movable closer to the support structure. In an exemplary structure, the support structure includes a pin, spindle or shaft at an end portion of the support structure with the at least one end portion of the panel supported on the pin, spindle or shaft. In another example combined with or separate from any of the foregoing examples, an end portion of the support structure includes a slanted or angled surface for providing space for movement of an adjacent end portion of the panel.

In another example of a cleaning tool, for example for interior cylindrical surfaces, cleaning tool includes a support structure or frame and a resiliently flexible panel supported at opposite end portions of the support structure or frame. The resiliently flexible panel includes end portions wherein each end portion extends from the first and second respective opposite sides, and wherein the resiliently flexible panel is supported by the support structure or frame at first sides of the first and second respective opposite sides so that the panel is not centered from side to side on the support structure, but instead the support structure is positioned closer to one edge of the resiliently flexible panel than to the other edge. In one configuration, the resiliently flexible panel is supported on the support structure or frame in such a way that at least one end portion of the resiliently flexible panel is movable closer to at least one end portion of the support structure or frame. In another example, at least one end portion of the support structure or frame includes a slanted or angled surface, slanted in a direction in which a portion of the resiliently flexible panel extends arcuately.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

As used herein, "substantially" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

Figure 7:
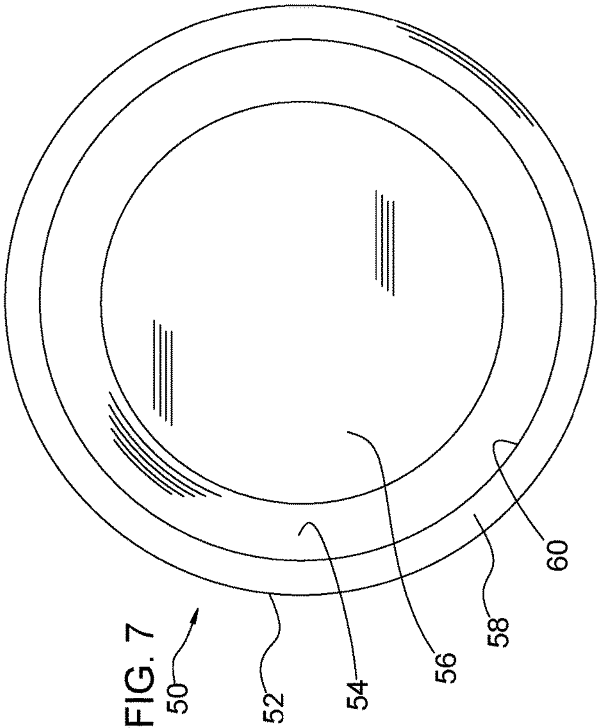
FIG. 7 is a perspective view of a cylindrical body having a closed end and an opposite open end with a constricted opening.

A cleaning tool 100 (FIGS. 1-3) can be used to clean the inside of a channel, tube, receptacle and/or other cylindrical or partially cylindrical container or conduit, for example such as may be used for moving fluids, powders or other materials. In one example of a structure that can be cleaned with a cleaning tool such as those described herein, an enclosure 50 is formed cylindrical, with a cylindrical wall 52 extending longitudinally (into the image as viewed in FIG. 7) and circularly, as can be seen in FIG. 7. The enclosure 50 can be part of a tube, pipe or other longitudinally extending enclosure, or it can be a receptacle as illustrated. In the illustrated example, the cylindrical wall includes an inside or interior surface 54 extending longitudinally parallel to a central axis to an end surface 56, forming the closure for the enclosure 50. FIG. 7 shows an exaggerated perspective/convergence of the cylindrical wall for purposes of illustration, while it is understood that the enclosure 50 in the example is a conventional closed cylindrical receptacle. In the present example, the enclosure 50 includes a rim 58 at the end of the enclosure opposite the end surface 56. The rim 58 extends inward from the cylindrical wall 52 to a circular edge surface 60. Other configurations of enclosure can also accommodate the cleaning tools described herein.

The cleaning tool 100 includes a frame 102 or other support structure for supporting a support panel 104. The frame includes a control attachment 106, which is used by a user to manipulate the cleaning tool. The control attachment in the illustrated examples removably receives a handle or other implement (not shown) for moving and controlling the cleaning tool. In many instances, the control attachment 106 is a handle attachment for receiving a handle or handle extension, for example threaded into the control attachment, and releasably secured by a fastener 108 or other securement. The control attachment is pivotable about an axis 110, to allow adjusting the orientation of the support panel and cleaning material (described more fully below)

relative to the handle, for example about 180°. The control attachment is fixed to a portion of the frame, in the present example centered between endpoints on a portion of the frame.

The frame 102 includes a transversely extending brace bar 112, extending transversely of the handle and the support panel 104. The brace bar includes a first end portion 114 and a second end portion 116. In the illustrated configuration, the brace bar extends linearly between the first and second end portions. The second end portion 116 in the illustrated configuration includes an angled interior surface 117, formed to face the concave surface of the support panel 104 when the support panel is in place. The angled interior surface 117 permits greater inward movement and/or bending of the support panel toward the first end portion of the support panel, to permit easier passage of the cleaning tool past a rim of an opening, for example rim 58. The control attachment 106 is substantially centered between the first and second end portions. The frame includes a radial support rod 118, in the present example extending from the center of the brace bar 112 into contact with the support panel 104. The control attachment is mounted to the radial support rod where the radial support rod intersects the brace bar 112.

The frame 102 supports the support panel 104 at respective first and second end portions of the support panel, 120 and 122, respectively. In the present example, the first support panel end portion 120 is fixed or otherwise secured to the brace bar at the first end portion 114 of the brace bar. Also in the present example, a center portion of the first support panel end portion is mounted to the brace bar, or in other words, the frame 102 is centered axially of the support panel 104.

Figure 2:
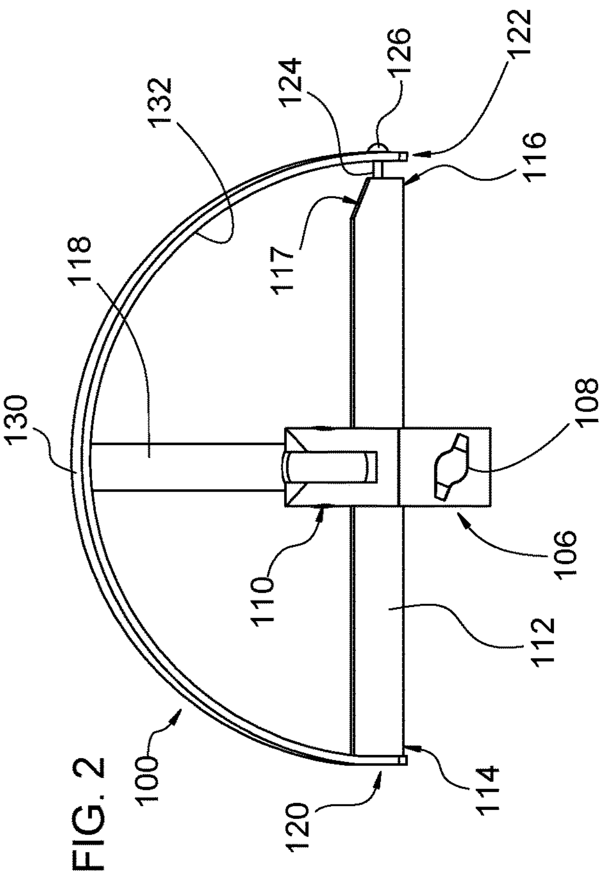
FIG. 2 is a top plan view of the cleaning tool of FIG. 1.
Figure 3:
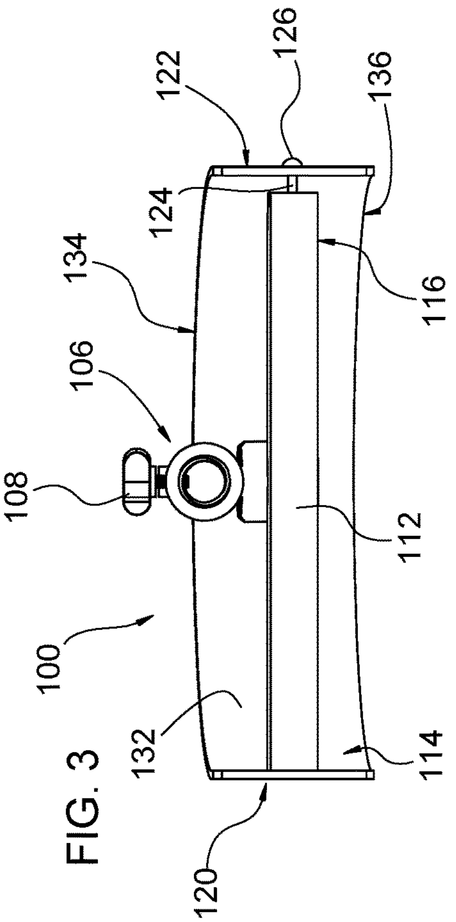
FIG. 3 is a rear elevation view of the tool of FIG. 1.
Figure 1:
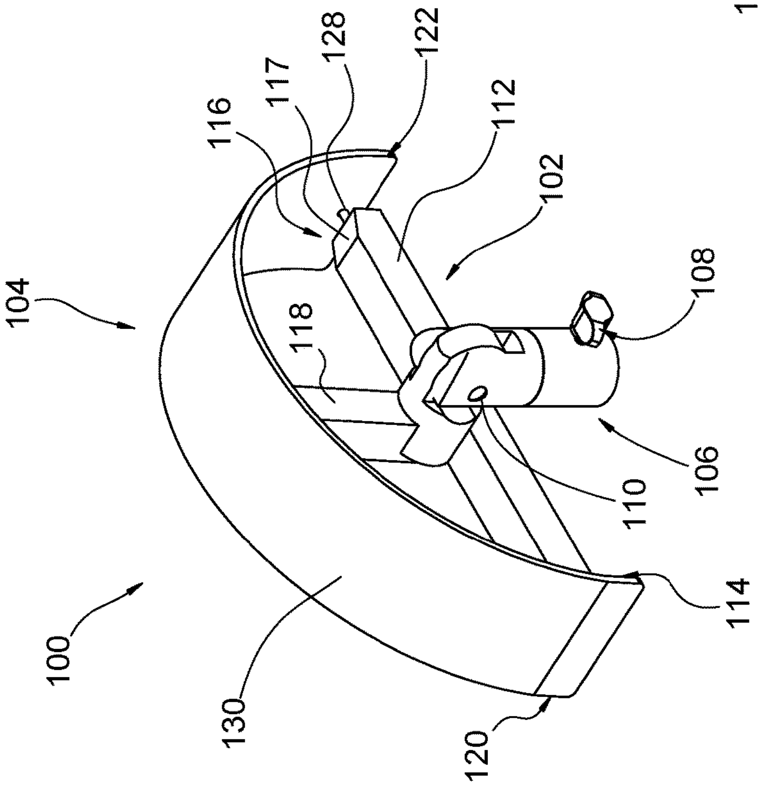
FIG. 1 is an upper front isometric view of an example of a cleaning tool.

The support panel 104 is a planar support panel having a width that is substantially greater than its thickness. The width and thickness can be selected as desired, and the ratio of the thickness to the width can also be selected as desired. The length of the support panel is selected so as to fit on and be supported by the frame 102 in a semicircular configuration, for example as can be seen in FIGS. 1-2. The frame can be configured to support the support panel in other geometric configurations, as a function of the configuration of the frame.

The second end 122 of the support panel 104 is supported on the second end 116 of the frame 102. The second end 122 is supported in such a way that the second end of the support panel can move closer to the frame or closer to the first end of the support panel. Moving closer to the first end of the support panel reduces the maximum spacing between the first and second ends, and makes easier insertion of the cleaning tool into a channel, pipe or receptacle, including ones such as receptacle 50 having a reduced diameter rim 58.

In the present example, the second end portion 122 of the support frame 104 is supported on a pin 124 mounted on the brace bar 112 at the second end 116. As illustrated, the pin extends into the brace bar parallel to a longitudinal axis of the brace bar, but can extend at an angle to the longitudinal axis, for example to make easier or more difficult the movement of the second end 122 of the support panel toward the first end 120.

The pin 124 includes a head or stop 126 for limiting outward movement of the second end portion 122. The pin in one example is a flathead screw resting in a countersink in the support panel. The support panel 104 includes an opening or other geometry 128 allowing the desired movement of the support panel on the pin 124. In the present examples, the inside surface of the head 126 is approximately one half inch from the adjacent surface of the brace bar 112 for an approximately 12 inch diameter, semi-circular support panel, or in other words about 4% or between 3-10% of the length of the combined brace bar and pin. Similar spacing can be used with smaller diameters, such as an 8 inch diameter support panel, or the spacing can be reduced using a similar ratio. Other diameters for the support panel can also be used.

A similar pin (not shown) may also be used on the first end portion of the frame to support the first end portion of the support panel to allow the first end portion of the support panel to move closer to the second end portion of the support panel.

The support panel 104 may be formed from polytetrafluoroethylene or Teflon, low density polyethylene, or other resiliently flexible materials having sufficient stiffness and strength to be resiliently flexible and to maintain its shape against the inside surface of a cylindrical wall and to support a cleaning material such as a fabric, foam or similar material placed over the support panel. In the present example, the support panel 104 is formed from a planar material, in the present example about ⅛ inch thick, and placed on the frame so that an outside surface 130 is substantially smooth and uniform, and the inside surface 132 is also substantially smooth and uniform. Other configurations may be used.

Figure 8:
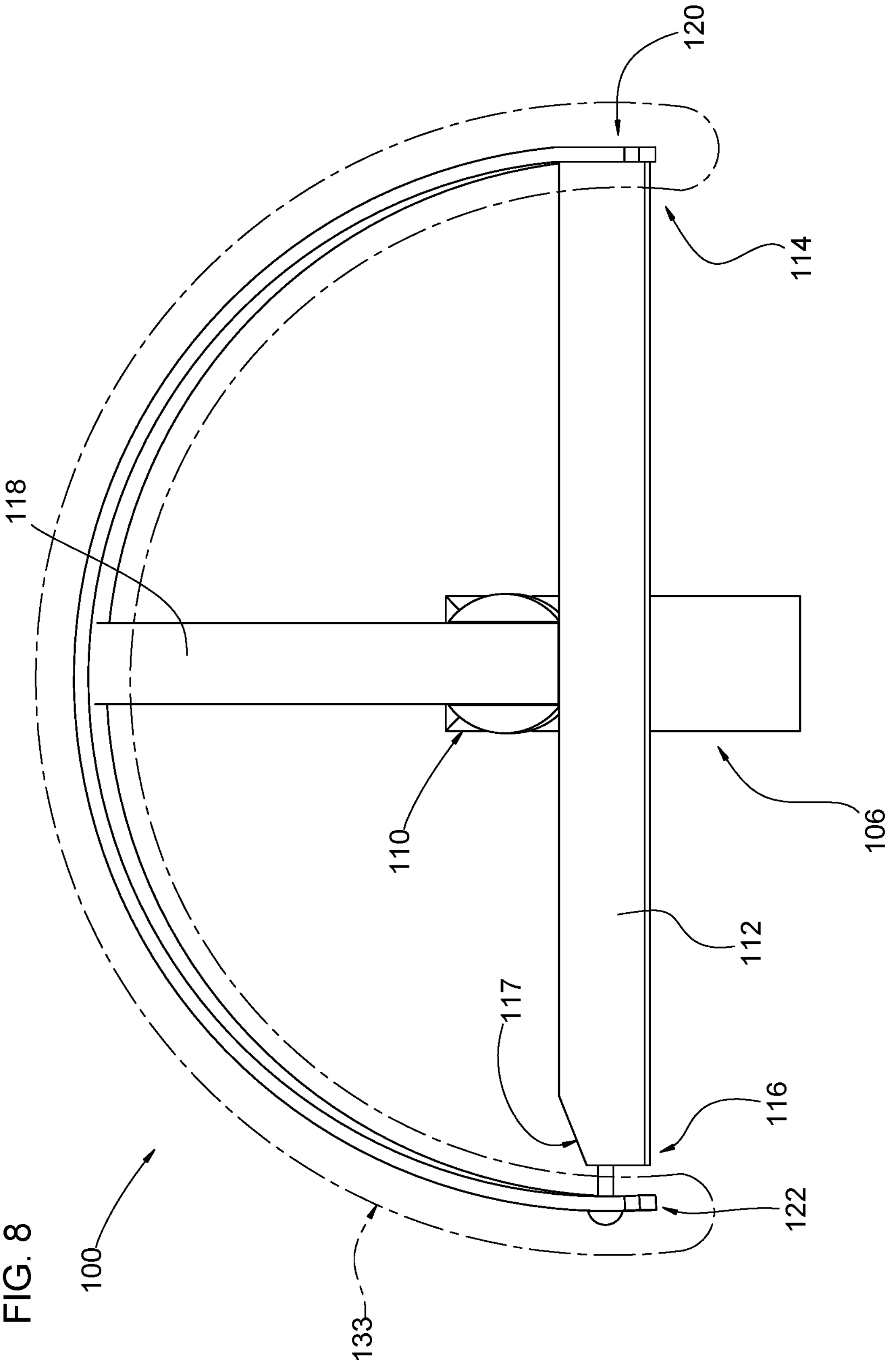
FIG. 8 is a top plan view of the cleaning tool of FIG. 1 with a cleaning element supported thereon.

A cleaning element in the form of a cleaning pad 133 (FIG. 8) can then be mounted or secured on the support panel 104. The cleaning pad may be formed from any number of materials or combinations of materials, including foam, cloth, mesh, microfiber or other cleaning material. The cleaning pad preferably extends over the exterior surface 130 of the support panel and around the first and second end portions of the support panel. The cleaning pad also preferably extends over the arcuate edge surfaces 134 and 136 of the support panel and opposite edge portions of the cleaning pad extending over the arcuate edge surfaces secured to each other. In many configurations, the cleaning pad will cover substantially all of the support panel 104, and in some configurations, the cleaning pad will also cover substantially all of the frame but the control attachment 106.

Figure 4:
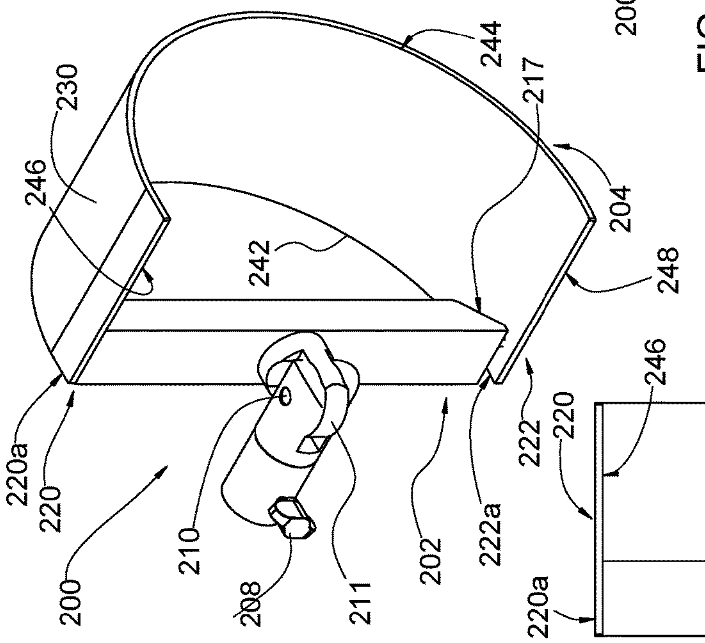
FIG. 4 is an upper rear isometric view of another example of a cleaning tool.
Figure 5:
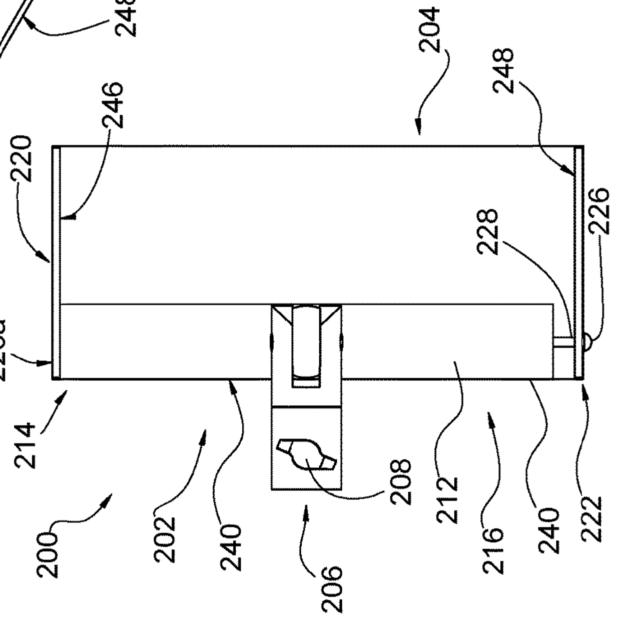
FIG. 5 is a top plan view of the cleaning tool of FIG. 4.
Figure 6:
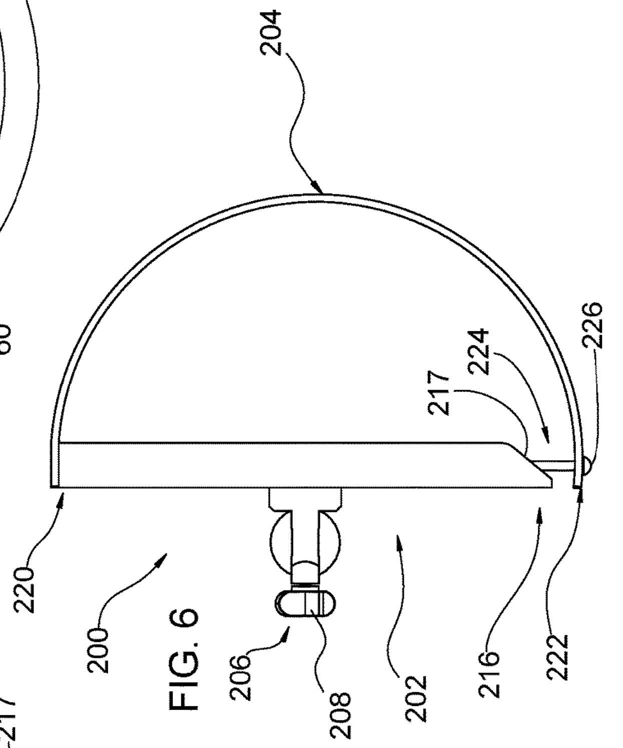
FIG. 6 is a bottom plan view of the cleaning tool of FIG. 4.

In another example (FIGS. 4-6) of a cleaning tool 200, for example a cleaning tool for cleaning enclosures such as described herein, the cleaning tool includes a frame 202 for supporting a support panel 204. The frame includes a control attachment 206 having the same or similar structures and functions as the control attachment 106 described above. A handle or other control device may be releasably secured by fastener 208 or other securement. The control attachment is also pivotable about an axis 210 forming part of a block 211 fixed to a portion of the frame 202, for example pivotable about 180°.

Frame 202 includes a transversely extending brace bar 212, extending transversely of the handle and the support panel 204. The brace bar includes a first end portion 214 and a second end portion 216. In the illustrated configuration, the brace bar extends linearly between the first and second end portions. The second end portion 216 in the illustrated configuration includes an angled interior surface 217, formed to face the concave surface of the support panel 204 when the support panel is in place. The angled interior surface 217 permits greater inward movement and/or bending of the support panel toward the first end portion of the support panel, to permit easier passage of the cleaning tool past a rim of an opening, for example rim 58. In the illustrated example, the control attachment 206 is substantially centered between the first and second end portions.

The frame 202 supports the support panel 204 at respective first and second end portions of the support panel, 220 and 222, respectively. In the present example, the first support panel end portion 220 is fixed or otherwise secured to the brace bar at the first end portion 214 of the brace bar. In another configuration, the first support panel end portion 220 can be supported on a pin or other retainer allowing movement of the first support panel end portion toward the second support panel end portion. The support panel 204 is mounted at arcuate edge surfaces 220*a* and 222*a* of the first and second end portions of the support panel, rather than at portions of the first and second end portions intermediate the arcuate edge surfaces.

The support panel 204 is substantially the same as the support panel 104 described previously, except that the width of the support panel 204 is approximately twice that of the support panel 104, which in the present example is about 4 inches. The width of the support panel 204 is about 8 inches. The characteristics of the support panel are chosen in substantially the same way as that described above with respect to the support panel 104.

The second end 222 of the support panel 204 is supported on the second end 216 of the frame 202. The second end 222 is supported in such a way that the second end of the support panel can move closer to the frame or closer to the first end of the support panel 204. Moving closer to the first end of the support panel reduces the maximum spacing between the first and second ends of the support panel, and makes easier insertion of the cleaning tool into a channel, pipe or receptacle, including ones such as receptacle 50 having a reduced diameter rim 58.

In the illustrated example, the second end portion 222 of the support frame 204 is supported on a pin 224 mounted on the brace bar 212 at the second end 216. The pin extends into the brace bar parallel to a longitudinal axis of the brace bar, but can extend at an angle to the longitudinal axis. The pin 224 includes a head or stop 226. The support panel 204 includes an opening or other geometry 228 allowing the desired movement of the support panel 204 on the pin 224. The inside surface of the head 226 is approximately a half inch from the adjacent surface of the brace bar 212.

A cleaning pad (such as may be similar to the cleaning pad 133 in FIG. 8) can then be mounted on the support panel 204, and in some configurations part of the cleaning pad can be mounted on a portion of the brace bar 212 so that the external surface 230 of the support panel 204 and a lower surface 240 or all of the brace bar 212 can be covered with the cleaning pad. The cleaning pad would also cover the arcuate edge surfaces 242 and 244 of the support panel and the end surfaces 246 and 248 of the support panel adjacent the first and second end portions. Operable cleaning surfaces of the cleaning pad include those portions covering the arcuate edge surfaces, the external surface 230 of the support panel and the portion of the cleaning pad extending from a lower arcuate edge 242 of the support panel to the lower surface 240 of the brace bar. In such a configuration, the cleaning pad has an arcuate cleaning surface and a relatively flat cleaning surface. The arcuate cleaning surface can clean the concave surfaces of a pipe, channel or other cylindrical body, and the relatively flat cleaning surface can be used to clean the flat end surface of the receptacle, for example end surface 56. Additionally or alternatively, the handle can be positioned perpendicular to an axis of rotation of the support panel 204 (or similarly for the support panel 104 in the cleaning tool 100), and the handle can be used to press the external surface 230 of the support panel against the end surface 56 of the receptacle. The handle can then be rotated to rotate the support pad and support panel in a circle around the bottom of the receptacle to clean the end surface 56. Thereafter (or before), the handle can be positioned parallel to the axis of rotation of the support panel 102 and the handle rotated to rotate the support panel 204 and the cleaning pad around the outer portion of the end surface 56. Additionally or alternatively, where the cleaning pad is configured to cover all of the frame but the control attachment 206 (or 106), a substantial portion of the end surface 56 can be cleaned by rotating the handle when the handle is positioned parallel to the axis of rotation of the support panel.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A cleaning tool comprising:

a support structure extending from a first end portion to a second end portion, wherein the first end portion includes a pin;

a handle mounting structure on the support structure or frame;

a resiliently flexible panel having a first panel end portion supported by the first end portion on the support structure and a second panel end portion supported by the second end portion of the support structure such that the panel is supported to have an arcuate configuration, and wherein the first panel end portion is movable over the pin in a direction toward the second panel end portion.

2. The cleaning tool of claim 1 wherein the support structure is a linearly extending bar.

3. The cleaning tool of claim 1 wherein the support structure is substantially straight.

4. The cleaning tool of claim 1 wherein the handle mounting structure is mounted on the support structure at substantially a center of the support structure.

5. The cleaning tool of claim 1 wherein the handle mounting structure is configured to be pivotable.

6. The cleaning tool of claim 1 wherein the support structure includes an additional structure extending perpendicular to the support structure in a direction away from the support structure and contacting the resiliently flexible panel.

7. The cleaning tool of claim 1 wherein the first panel end portion is movable on the support structure toward the second panel end portion, and wherein the second panel end portion is movable on the support structure toward the first panel end portion.

8. A cleaning tool comprising:

a support structure extending from a first end portion to a second end portion;

a handle mounting structure on the support structure or frame;

a resiliently flexible panel having a first panel end portion supported by the first end portion on the support structure and a second panel end portion supported by the second end portion of the support structure such that the panel is supported to have an arcuate configuration, and wherein at least one of the first and second panel end portions is movable in a direction toward the other of the first and second panel end portions; and wherein the support structure includes a pin mounted to the first end portion and wherein the first panel end portion of the resiliently flexible panel includes an opening configured to permit movement of the first panel end portion along the pin.

9. The cleaning tool of claim 1 wherein the resiliently flexible panel is held on the support structure in a flexed configuration.

10. The cleaning tool of claim 1 wherein the resiliently flexible panel is supported on the support structure at an approximate center of the first panel end portion and at substantially a center of the second panel end portion.

11. The cleaning tool of claim 1 wherein the resiliently flexible panel is supported on the support structure at an end portion of the first panel end portion and at an end portion of the second panel end portion.

12. The cleaning tool of claim 1 wherein the second end portion of the frame includes an angled surface.

13. The cleaning tool of claim 1 further including a cleaning element mounted on and supported by the resiliently flexible panel.

14. The cleaning tool of claim 13 wherein the cleaning element is mounted on and supported by the resiliently flexible panel and includes a portion extending to and supported by the support structure.

15. A cleaning tool comprising:

a support structure for a cleaning material wherein the support structure extends linearly from a first end portion to a second end portion;

a retainer on the second end portion;

a pivotable handle mounting structure on the support structure;

a resiliently flexible panel having a first panel end portion supported by the first end portion on the support structure and a second panel end portion supported by the retainer on the support structure such that the panel is supported to have an arcuate configuration, and wherein the second panel end portion is movable on the retainer in a direction toward the first panel end portion a first distance to an end surface of the second end portion.

16. The cleaning tool of claim 15 wherein the retainer is configured to permit the resiliently flexible panel to move along the retainer.

17. The cleaning tool of claim 16 wherein the retainer is positioned on the support structure at an angled surface of the support structure.

18. The cleaning tool of claim 17 further including a cleaning material.

19. A cleaning tool comprising:

a support structure for a cleaning material wherein the support structure extends linearly from a first end portion to a second end portion having an angled surface;

a retainer on the second end portion having a stop surface at a distal end of retainer and wherein the retainer extends a first distance from the stop surface to the angled surface;

a pivotable handle mounting structure on a center portion of the support structure;

a resiliently flexible panel having a first panel end portion supported by the first end portion on the support structure and a second panel end portion supported by the retainer on the support structure such that the panel is supported to have an arcuate configuration, and wherein the second panel end portion is movable on the retainer from the stop surface in a direction toward the first panel end portion over the first distance to the angled surface.

* * * * *